United States Patent [19]
Lapota

[11] Patent Number: 5,625,262
[45] Date of Patent: Apr. 29, 1997

[54] SYSTEM FOR EQUALIZING THE LOAD OF A PLURALITY OF MOTORS

[75] Inventor: Robert J. Lapota, Greenfield, Wis.

[73] Assignee: Harnischfeger Corporation, Milwaukee, Wis.

[21] Appl. No.: 582,405

[22] Filed: Jan. 3, 1996

[51] Int. Cl.⁶ .................................................. H02P 5/50
[52] U.S. Cl. ........................ 318/71; 318/77; 318/61; 318/48; 318/799; 318/432; 318/98
[58] Field of Search ................................. 318/432, 434, 318/100, 41, 98, 48, 50, 99, 51, 69, 61, 64, 68, 77, 71, 799, 805, 801, 802

[56] References Cited

U.S. PATENT DOCUMENTS

| | | | |
|---|---|---|---|
| 4,215,305 | 7/1980 | D'atre et l. | 318/803 |
| 4,392,100 | 7/1983 | Stanton et al. | 318/803 |
| 4,632,222 | 12/1986 | Faig et al. | 318/138 |
| 5,113,125 | 5/1992 | Stacey | 318/721 |

*Primary Examiner*—John W. Cabeca
*Attorney, Agent, or Firm*—Richard C. Ruppin

[57] ABSTRACT

A system having two or more A.C. motors driving the same load. The stator windings and rotors of both motors each conduct current having a vector representative of a magnitude and angular position of the current in the respective rotor and stator winding. Stator current sensors are provided for producing an indication of the magnitude of the stator current vector to each motor. Encoders are provided for sensing the rotating speed of each of the rotors from which can be calculated the angular position of the rotor load current vector with respect to the rotating stator flux current vector. A first torque control controls the magnitude of the stator current of a first one of the motors such that the stator flux current vector of the first motor and the rotor load current vector of the first motor are angularly separated by 90°. This angular relationship produces maximum torque at the rotating speed of the first motor. A second torque control receives an indication of the magnitude of the torque of the first motor from the first torque control. Using this information, the second torque control controls the magnitude of the current of the stator of the second motor such that the angular position of the stator flux current and rotor load current vector of the second motor have a 90 ° separation so that the second motor produces substantially the same magnitude of torque as the first motor.

11 Claims, 3 Drawing Sheets

SYSTEM FOR EQUALIZING THE LOAD OF A PLURALITY OF MOTORS

This invention relates generally to a motor control system to assure equalization of the load of a plurality of motors each connected to a device being driven and, more particularly, to a system for controlling alternating current motors having adjustable frequency power supplies and utilizing vector control technology to accomplish substantially equal load sharing.

BACKGROUND OF THE INVENTION

A common type of drive system using plural motors couples each of the motors to a load being driven through the drive shafts of the motors and means such as gear boxes and/or line shafts. In such drive systems, the motor loads may become unstable and fail to equally share the load resulting in the inability of the system to utilize the full load capacity of all the motors and impart undue stress to the drive train. In overhead traveling cranes and gantry cranes having an overhead lifting beam, plural drive systems comprising two motors independently connected to a common hoist rope drum are sometimes a preferred drive method. Such overhead cranes travel on a pair of elevated rails which are parallel and spaced apart. One or more bridge girders span the rails and have drive wheels mounted at either end in engagement with the rails to move the girders and thereby the crane along the rails. In gantry cranes, parallel spaced apart rails are positioned at ground level and legs connected at their upper ends by load carrying beams or girders are supported at their lower ends by drive wheels mounted on the legs in engagement with the wheels. The wheels are driven to thereby move the gantry crane along the parallel rails.

A trolley is mounted on parallel rails affixed to the overhead girders of the overhead or gantry crane and has drive wheels engaging the girder rails to move the trolley along the length of the girders. A load hoist is mounted on the trolley and includes a powered hoist rotatable drum about which a steel rope is wound or unwound to lift or lower a load. The rope is connected to a load lifting device such as a hook, sling or a magnet. The lifting or lowering operation of the hoist, the movement of the trolley on the overhead girders, and the movement of the crane along its rails are controlled by an operator to pick up, move and deposit a load anywhere in the area traveled by the crane.

Drive systems for cranes have increasingly used alternating current motors provided with adjustable frequency power supplies. Adjustable frequency power supplies can be controlled by the operator to provide a frequency to a motor ranging from zero to rated frequency or more. Squirrel cage induction type motors are typically used and are reliable, low cost and widely available. In an adjustable frequency power supply, not only can the frequency be varied, but the voltage supplied to the motor and, due to both the ability to vary the frequency and the voltage, the motor current and thereby the motor output torque can be controlled. More recently, adjustable frequency power supplies utilizing angular positions of current vectors to control motor output torque have come into use.

It is sometimes desirable to provide overhead and gantry type cranes, particularly the hoists of such cranes, with two motors both having their drive shaft output ends mechanically coupled to and driving the same hoist drum through suitable gear boxes. To assist in maintaining an equal division of the hoist load between the motors, the drive shafts of the motors are also coupled directly to each other. Each motor is provided with a separate adjustable frequency power supply. A single master switch moved by the operator controls the frequency output of both adjustable frequency power supplies to the two motors. Each motor will draw motor current from its connected power supply and provide output torque to the hoist drum to approximately carry one half of the load of the hoist drum. If the power supplies to the motors are of the type that utilize current vector positions to maximize the torque provided by each motor, an encoder having its output fed back to the power supply of a first one of the motors is provided for sensing the speed of the first motor output shaft and its rotor, and the rotor position, which can be used to calculate the angular position of the rotor load current vector. The first motor is considered as the master motor. A sensor is also provided for each motor for indicating the angular position of the stator flux current vector in each motor. The maximum torque of each motor is produced when its rotor load current and stator flux current vectors are spaced at a ninety degree angle to each other and, upon the comparison of the angular difference of the encoder output and the sensor output, if the angular difference is not ninety degrees, the magnitude of the stator current of the power supply to the motor will be changed to result in a shift in the position of the stator flux current vector to produce the desired ninety degree relationship with the rotor load current vector.

Both motors are supplied with the same frequency so that they should rotate at the same speed and, at that speed, both should produce the same maximum torque due to the current vector angle control. However, in fact, the two motors do not operate stably to equally share the load. This is due largely to variation in fabrication of motors that are otherwise identical and differences in fit and friction of the drive train connected to the motor and hoist drum. The instant invention is an improvement in motor load sharing systems where plural motors are coupled to the same load.

SUMMARY OF THE INVENTION

It is a general object of the invention to provide a stable operating system that equalizes the loading of a plurality of alternating current (A.C.) motors utilizing adjustable frequency power supplies or drives.

The invention is carried out in a system having two or more alternating current motors driving the same load and which are preferably of an A.C. induction squirrel cage type. Each of the two motors has a stator winding and a rotor, the rotor rotating at a speed determined by the frequency of the power supplied to the motor and the load on the motor. The stator windings and rotors of both motors each conduct current having a vector representative of a magnitude and angular position of the current in the respective rotor and stator windings. A stator current sensing means is provided for each motor and is positioned at the power supply to the motors for producing an indication of the magnitude of each of the stator current vectors to the motors. Encoder means is positioned adjacent to the output shaft of each of the rotors of the two motors for sensing the rotating speed of each of the rotors from which can be calculated the angular position of the rotor load current vector with respect to the rotating stator flux current vector.

A first torque control means operates to control the magnitude of the stator current of a first one of the motors such that the stator flux current vector of the first motor and the rotor load current vector of the first motor are angularly separated by 90°. This 90° angular relationship is the most efficient operating mode of the motor and produces maximum torque at the rotating speed of the rotor of the first motor. A second torque control means receives an indication of the magnitude of the torque of the first motor from the first torque control means. Using this information, the second torque control means controls the magnitude of the current of the stator of the second motor such that the angular position of the stator flux current rotor load current vector of the second motor have a 90° separation so that the second motor produces substantially the same magnitude of torque as the first motor. Thus, the second torque control means is responsive to the torque indication of the first torque control means and any differential between the torque produced by the second motor and the torque produced by the first motor causes control of the angular separation of the rotor load current vector and stator flux vector currents.

An indication is also provided to the second torque control means of the speed of the rotor of the first motor. The second torque control means utilizes this speed indication to approximately control the speed of the rotor of the second motor to match the speed of the rotor of the first motor. In this manner the second torque control means is assisted in controlling the magnitude of the stator current vector of the second motor. In addition, the second torque control means would typically be responsive to a lack of a 90° angular separation between the current vectors of the stator and rotor of the second motor to adjust the separation angle to 90° and thereby cause the motor to produce maximum torque at a specific rotating speed.

Where the load on the motors comprises a hoist having a continuous downward load bias, there is a corresponding bias in the backlash play or movement of the gear drive connections between the motors and the hoists. Although the motors are controlled by the torque control means to divide the torque required and thereby equally share the load, the downward bias of the hoist which takes up the backlash movement tends to minimize any hunting or shifting back and forth of a part of the load by the motors. Also, where the inventive system is used to control a hoist load, the 90° angular separation between the stator flux current vector and the rotor load current vector of each of the motors has the stator flux current vector leading the rotor load current vector when the hoist load is being lifted and the motors are in fact in a motoring mode and has the stator flux current vector lagging the rotor load current vector when the hoist load is being lowered and the motors are actually in an overhauling or generating mode.

BRIEF DESCRIPTION OF THE DRAWINGS

Further objects and advantages of the invention will appear when taken in conjunction with the accompanying drawings, in which:

FIG. 2 is a plan view of a trolley and hoist comprising a part of the crane illustrated in FIG. 1;

DETAILED DESCRIPTION OF THE INVENTION

Figure 1:
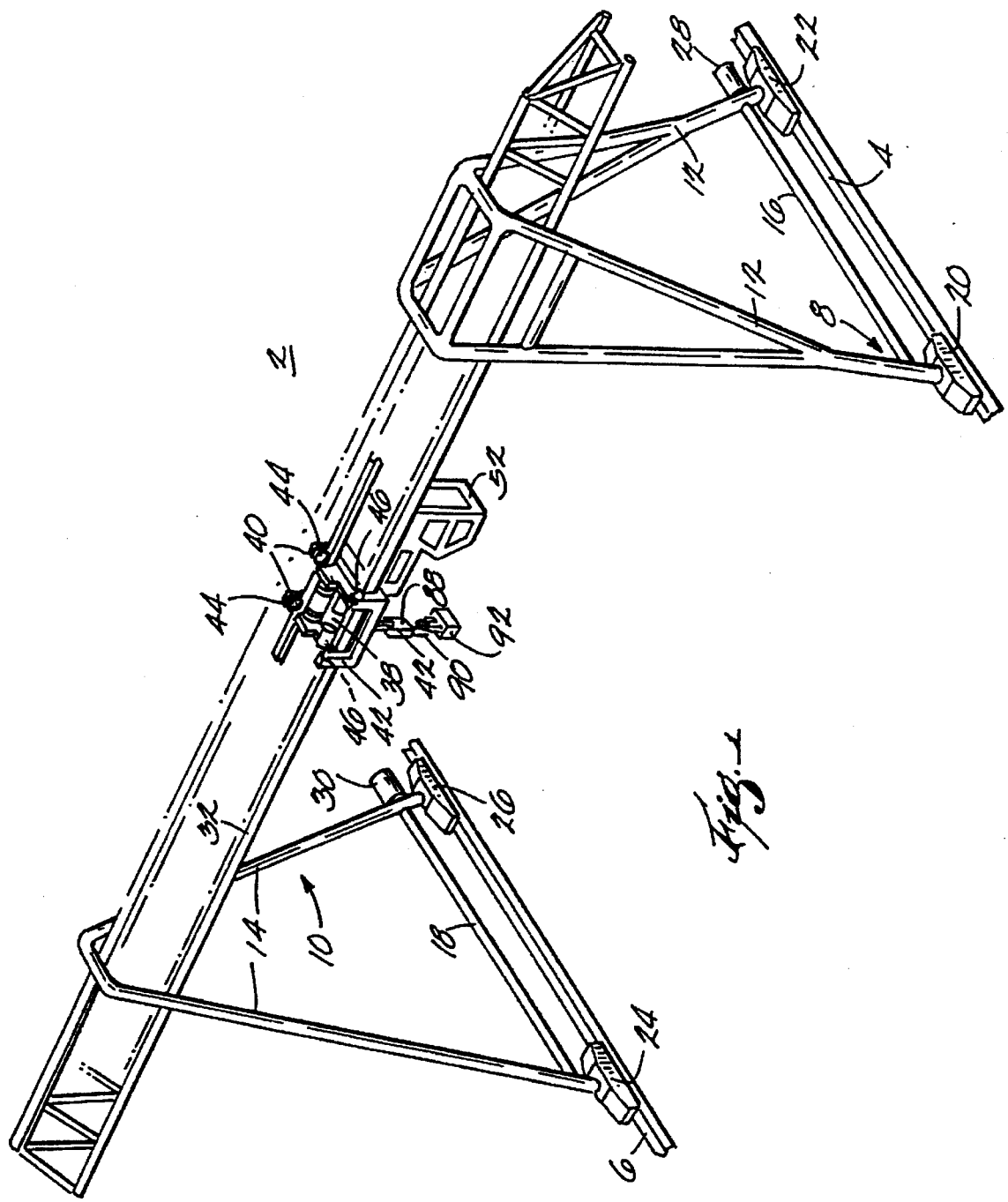
FIG. 1 is a perspective view of a portal type gantry crane in which the invention described herein is utilized.
Figure 1:
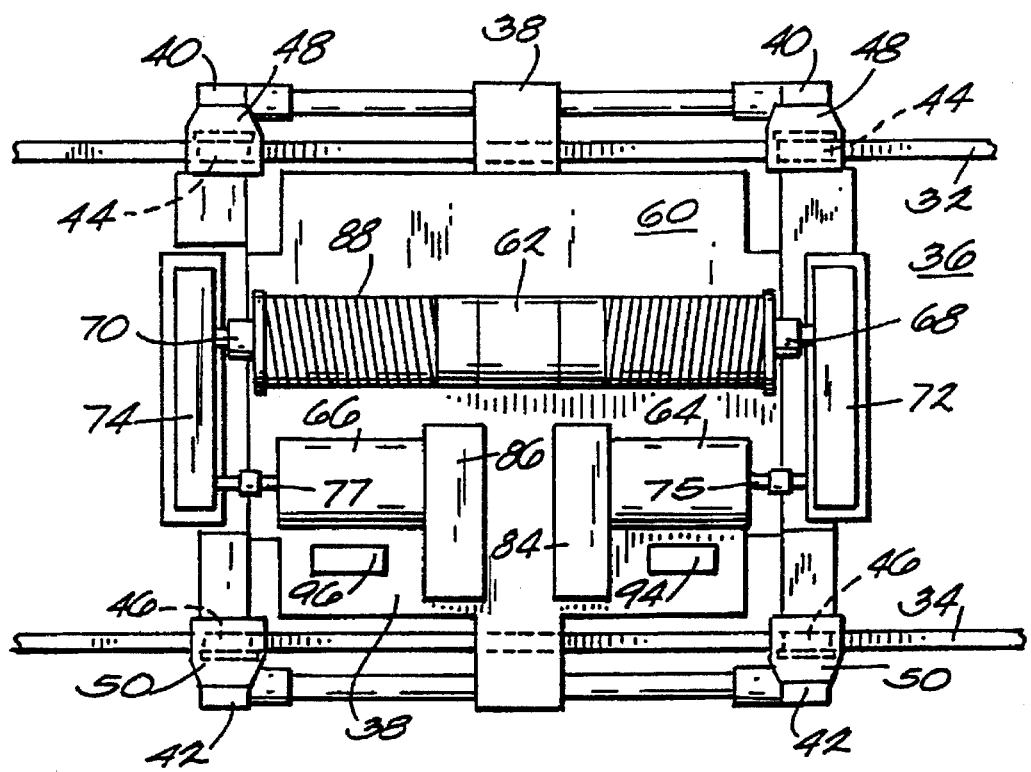

Referring to FIG. 1 of the drawings, a gantry crane of the portal type incorporating the invention is illustrated as having a frame 2 disposed generally horizontally and overlying two spaced-apart legs 8 and 10 affixed to the frame 2. The rails 4 and 6 run through a storage area for material which is to be lifted and transported into and out of the storage area by the crane. The legs respectively include elongated members 12 and 14, lower bases 16 and 18, and spaced-apart wheel assemblies 20, 22 and 24, 26. The wheel assemblies 20, 22 engage and ride on the rail 4 and the wheel assemblies 24, 26 engage and ride on the rail 6, thus permitting the portal crane to travel along the rails 4 and 6 through the material storage area. Drive motors 28 and 30 are respectively mounted on wheel assemblies 22 and 26 for moving the crane along the rails 4 and 6.

The frame 2 includes a pair of parallel tracks 32 and 34 on which a trolley 36 is carried for travel along the length of the frame 2. The trolley 36 includes an overhead frame 38, a hoist 60 mounted on the frame 38, and two pair of legs 40 and 42 extending upwardly from the frame 38 and on which a pair of trolley support wheels 44 and 46 are mounted. The wheels 44 and 46 engage the tracks 32 and 34 and support the trolley on the tracks. A trolley drive motor 48 is mounted on each one of the pair of legs 40 and drives the wheels 44 and a trolley drive motor 50 is mounted on each one of the pair of legs 42 and drives the wheels 46. An operator cab 52 is also mounted on the trolley.

The hoist 60 comprises a rotatable drum 62, a plurality of motors 64 and 66 and gear boxes 72 and 74. The motors 64 and 66 are coupled to the drum 62 only at the opposite shaft ends 68 and 70 of the drum 62 through the gear boxes 72 and 74. The motors 64 and 66 respectively include shafts 75 and 77 and are connected at their output ends 76 and 78 to the gear boxes 72 and 74. At their opposite ends, the motor shafts are connected to brakes 84 and 86 for stopping or holding the drum. An encoder 98 is mounted adjacent to the output shaft end 76 of the motor 64 for providing an indication of the speed and the position of the shaft 75 and thereby the rotor 100 of the motor 64 affixed to the shaft 75. A similar encoder 102 is mounted adjacent to the output shaft end 78 of the motor 66 for indicating the speed and position of the shaft 77 and thereby the rotor 104 of the motor 66. The hoist 60 further includes a wire rope 88 having a load carrying device such as a hook 90 at its lower end and is affixed to the drum 62 at its upper end so that it may be wound onto or paid out from the drum by the simultaneous rotational drive of the motors 64 and 66 to lift or lower an object such as a load 92 carried by the hook. The motors 64 and 66 are preferably of the three phase A.C. squirrel-cage induction type which may, for example, have a rated synchronous speed of 1200 rpm at 60 hertz.

Figure 3:
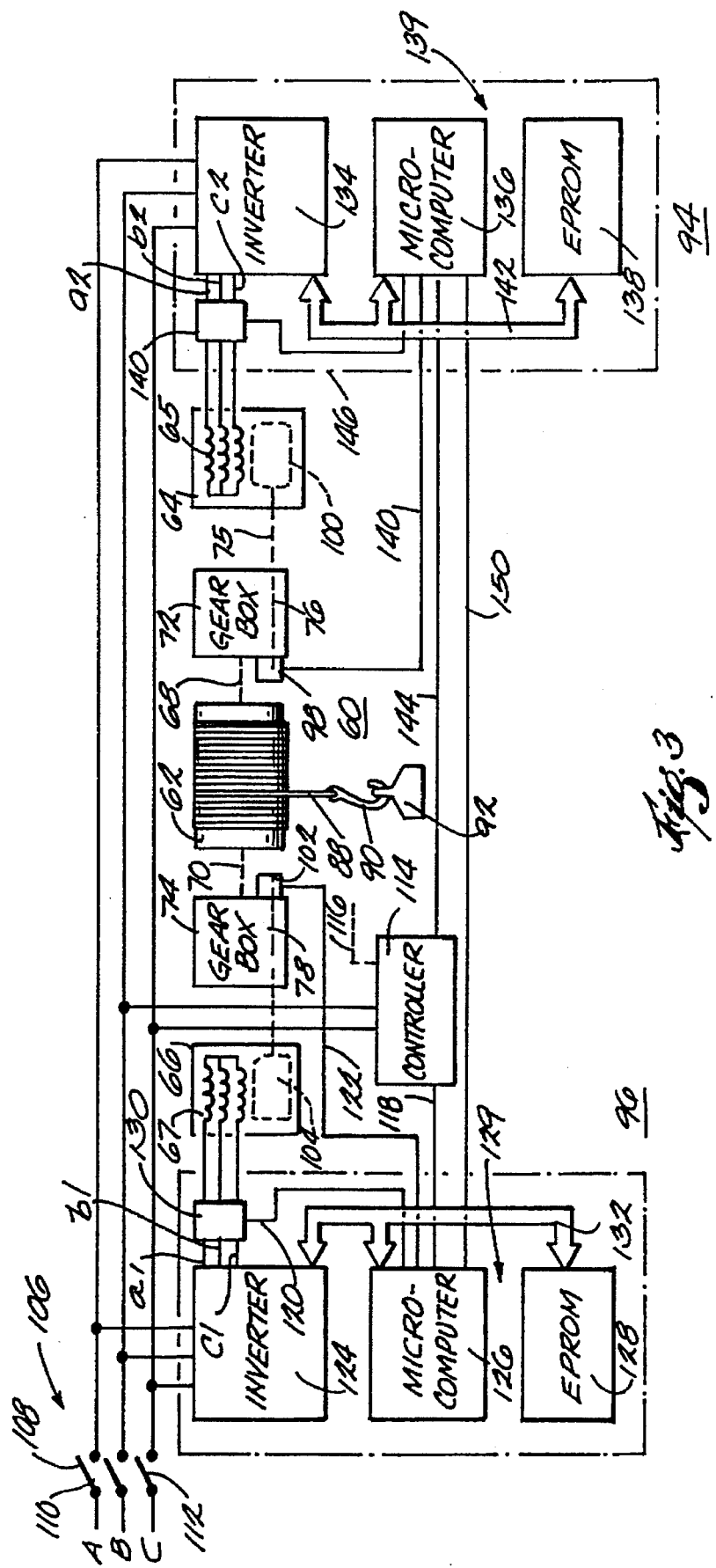
FIG. 3 is a circuit diagram of a system for equalizing the torque of two or more motors driving a single hoist load.

With reference to FIGS. 2 and 3, a controller 114 located in the operator cab 52 (location not shown) is provided for hoist, trolley and crane operation and control. Adjustable frequency drives 94 and 96 are mounted on the trolley 36 for providing electrical power to the hoist motors 64 and 66. Each drive 94 and 96 is supplied with three phase 60 hertz power from lines A, B and C through switch contacts 108, 110 and 112 of switch 106. Power is also supplied to controller 114 from lines B and C through a step down transformer (not shown) and the switch contacts. The controller 114 includes an operating lever 116 and provides input signals to the adjustable frequency drive 94 and 96 for operating the drives and providing a speed command to the drives for controlling the frequency of the power from the drives to the hoist motors. The position of the lever also determines the sequence of the three phases supplied to the motors 64 and 66 and thereby the rotation direction of the motors for raising or lowering direction of the hoist 60.

The adjustable frequency drive 96 includes an inverter 124, a microcomputer 126 and an EPROM 128, all connected together by a bus 132. Information in digital signal form is transferred between the microcomputer 126, EPROM 128 and inverter 124 on the bus 132. The microcomputer 126 is also connected to the controller 114 via a line 118 representing a number of line electrical connections for transmitting information signals directing the control of the microcomputer 126. The microcomputer 126 is further connected via a line 120 to the stator current sensor 130, by a line 122 to the encoder 102, and by line 150 to adjustable frequency drive 94. The microcomputer 126 includes a microprocessor, a memory, and input and output units which are well known types of devices and are not shown, and which receive or transmit information on the bus 132 and the lines 118, 120, 122 and 150, and process and convert from one signal form to another the information received to provide control instructions to the inverter 124, EPROM 128 and controller 114 for the operation of the hoist 60.

The EPROM 128 contains a program for controlling the operation of the hoist 60 in conjunction with signals received by the microcomputer 126 from the controller 114, the inverter 124, the stator current sensor 130, and the encoder 102. The output of the inverter 124 is a three phase selectably variable frequency on the lines a1, b1 and c1 to the stator winding 67 of the motor 66. The inverter 124 is of a well known type in which the three phase power input is rectified to full wave direct current power and then converted to three phase alternating current power output with its frequency being variable and controllable by input signals from the microcomputer 126. The frequency of the three phase power supply to the stator winding 67, the magnitude and angular position of each of the three phase currents supplied by the inverter 124 to the motor stator 67, and thereby the torque of the motor 66, are all controllable by the microcomputer 126 and EPROM 128 via input signals from the microcomputer 126. In this respect, the microcomputer 126 and EPROM 128 function as a torque control means 129 as shown in FIG. 3.

The adjustable frequency drive 94 has the same components and operates in the same manner as the adjustable frequency drive 96, except for the connections and operation described below. Consequently, the components of the drive 94 and the devices it relates to which participate in driving the drum 62 will be only briefly described. The adjustable frequency drive 94 includes an inverter 134, a microcomputer 136, an EPROM 138 and a stator current sensor 140. The microcomputer 136 and EPROM 138 may together be considered as a torque control means 139 as shown in FIG. 3. A bus 142 connects the inverter 134, microcomputer 136 and EPROM 138. The microcomputer 136 receives signal indications from the stator current sensor 140 on line 146, from the encoder 98 on line 148, and from the microcomputer 126 on line 150. On line 144, the controller 114 transmits signals to the microcomputer 136 to enable the latter to control the supply of power to the motor 64. On line 150, the microcomputer 126 transmits an indication of the magnitude of the torque of the motor 66 to the microcomputer 136.

Figure 4A:
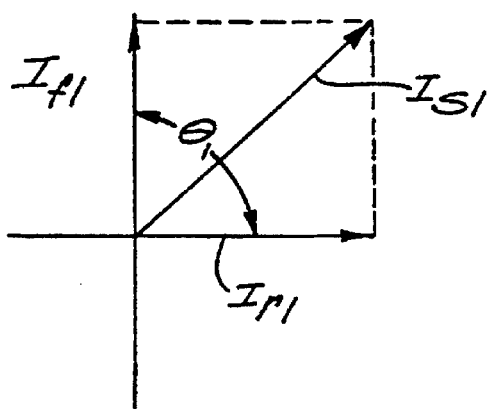
FIGS. 4A and 4B are respectively graphs of the stator flux current vector and rotor load current vector for one of the motors and the stator flux current vector and rotor load current vector for the other of the motors driving a load.

The three phase power supplied by the inverters 124 and 134 respectively to the motors 66 and 64 produce currents and rotating magnetic fields which, in turn, provide torque driving the hoist drum 62. The currents and magnetic fields can be represented by vectors and the current vector relationships for motor 66 will be first described. With reference to FIG. 4A, the three phase power supplied to the stator winding 67 of the motor 66 on lines a1, b1 and c1 produces currents in the three parts of the stator winding which may be represented by a single stator current vector $I_{s1}$ which is a vector sum of current vectors in the three phases and has a rotating angular position and a magnitude. The three phase currents in the stator winding 67 generate a three phase excitation or flux current component and an induced rotor load current component in the conductors of the rotor 104. The flux current component may be represented by a flux current vector $I_{f1}$ and the rotor load current component may be represented by a current vector $I_{r1}$. The stator current sensor 130 provides an indication of the magnitude of the current vector $I_{s1}$ to the microcomputer from which the magnitude and angular position of the flux current $I_{f1}$ is calculated. The encoder 102 provides an indication to the microcomputer 126 of the speed of the rotor 104 used in the calculation of rotor load current $I_{r1}$ magnitude and angular position. The flux current and the rotor load current together produce a rotating magnetic field developing a torque causing the rotor 104 to rotate and drive the load, in the instant example, the load 92 suspended from rope 88 and hook 90. The torque produced by the motor 66 providing the driving force is calculated by the microcomputer 126 from the equation $T_1 = K_1 I_{r1} I_{f1} \sin\theta_1$ where $\theta_1$ is the angle between $I_{r1}$ and $I_{f1}$ defining their relative angular positions, $K_1$ is a constant which takes into account motor losses and phasor and unit conversion factors, and $T_1$ is the torque of motor 66. From the equation for torque, it can be seen that an angle $\theta_1$ equal to a 90° angular position or separation between $I_{r1}$ and $I_{f1}$ will produce maximum torque, i.e., an angle of 90° as shown in FIG. 4A is the angular position relationship between $I_{r1}$ and $I_{f1}$ which is the most efficient mode of operation for maximum torque producing by the motor 66 at any given speed of the motor within its normal operating range. The angular positions of the current components $I_{r1}$ and $I_{f1}$ are also calculated by the microprocessor 124. Further, the vectors $I_{f1}$ and $I_{r1}$ are three phase vector sums, having an angle and magnitude determined by the magnitude of the three phase currents supplied to the stator winding 67. If the angle $\theta_1$ between $I_{f1}$ and $I_{r1}$ is not 90°, the magnitude of these three phase currents can be changed by an indication from microcomputer 126 to inverter 124 to thereby adjust the current vectors $I_{f1}$ and $I_{r1}$ angular relationship to 90°. Further, if a torque level is required that is greater or less than that maximum available at a specific motor speed where the angular separation between $I_{f1}$ and $I_{r1}$ is 90°, the magnitude of the three phase currents and thereby the magnitude of $I_{f1}$ can be, by an indication from microcomputer 126 to inverter 124, increased to increase maximum torque or decreased to decrease maximum torque albeit at a different motor speed.

Figure 4B:
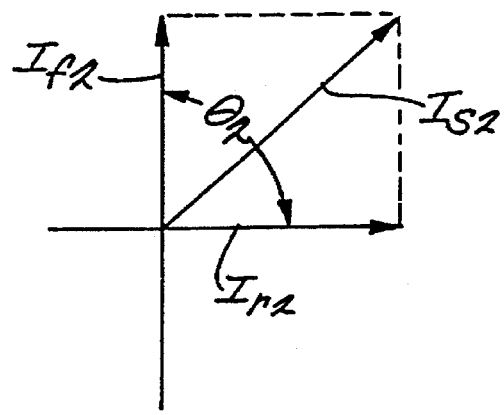

Considering now the current vector relationships for the motor 64 resulting from the three phase power supplied to it on lines a2, b2 and c2 by inverter 134, with reference to FIG. 4B, the three phase power supplied to the stator winding 65 of the motor 64 produces currents in the three parts of the stator winding 65 which may be represented by a single current stator vector $I_{s2}$ which is a vector sum of current vectors in the three phases and has a rotating angular position and a magnitude. The three phase currents in the stator winding 65 result in an excitation or flux current component and an induced rotor load current component in the rotor 100. The flux current component may be represented by a flux current vector $I_{f2}$ and the load current in rotor 100 may be represented by a current vector $I_{r2}$. The flux current and the rotor load current together produce a rotating magnetic field developing a torque causing the rotor 100 to rotate and drive the load 92. Thus the motors 64 and 66 are both driving the same load. The torque produced by the motor 64 providing driving force is calculated by the microcomputer 136 from the equation $T_2=K_2 I_{r2} I_{f2} \sin\theta_2$ where $\theta_2$ is the angle between $I_{r2}$ and $I_{f2}$ defining their relative angular positions, $K_2$ is a constant which takes into account motor losses and phasor and unit conversion factors, and $T_2$ is the torque of motor 64. When the angle $\theta_2$ is equal to a 90° angular position or separation between $I_{r2}$ and $I_{f2}$ as shown in FIG. 4B, maximum torque will be produced by the motor 64, i.e., an angle of 90° is the angular position relationship between $I_{r2}$ and $I_{f2}$ which is the most efficient mode of operation for maximum torque producing by the motor 64 at any specified speed of the motor within its normal operating range. The angular positions of the current components $I_{r2}$ and $I_{f2}$ are also calculated by the microprocessor 136. Since the vectors $I_{f2}$ and $I_{r2}$ are three phase vector sums having their angle and magnitude determined by the magnitude of the three phase currents applied to the stator winding 65, if the angle $\theta_2$ between $I_{f2}$ and $I_{r2}$ is not 90°, the magnitude of the three phase currents can be changed by an indication from microcomputer 136 to inverter 134, to thereby adjust the $I_{f2}$ and $I_{r2}$ angular relationship to 90°. Further, if a torque level is required that is greater or less than the maximum available at a specific motor speed where the angular separation between $I_{f2}$ and $I_{r2}$ is 90°, the magnitude of the three phase currents and thereby the magnitude of $I_{s1}$ can be, by an indication from microcomputer 136 to inverter 134, increased to increase maximum torque or decreased to decrease maximum torque albeit at a different motor speed.

The adjustable frequency drive 94 and the motor 64 operate in response to the operation of the hoist 60 and the torque magnitude indication on line 150 from the microcomputer 126. The encoder 98 produces an indicating signal to the microcomputer 136 from which the latter calculates the rotating angular position of the rotor load current vector $I_{r2}$. The stator current sensor 140 provides an indicating signal to the microcomputer 136 of the magnitude of the current vector $I_{s2}$ in the stator winding 65 from which the angular position of flux current vector $I_{f2}$ can be determined. The torque magnitude $T_2$ is calculated on a substantially continuous basis by the microcomputer 136. Further, an indication of the torque $T_2$ is compared with the indication of the torque $T_1$ received on line 150 from the microcomputer 126. If the torque $T_2$ differs from the torque $T_1$, the magnitudes of the currents of the three phase power supplied by the inverter 134 to the stator winding 65 are adjusted by an indication from the microcomputer 126 to the inverter 134 to change the magnitude of $I_{s2}$ and, thereby, to change the angular relationship of $I_{f2}$ and $I_{r2}$ to an angle of 90°. The magnitude of $I_{s2}$ may also be modified to increase or decrease the torque $T_2$ such that, with the modification of the angle $\theta_2$ to 90° and the adjustment to increase or decrease torque $T_2$ as necessary, the motor 64 will be operating at its most efficient torque producing condition and will be producing substantially the same torque as motor 66 to thereby equally divide the total torque between the two motors necessary to drive the load.

It will be understood that the foregoing description of the present invention is for purposes of illustration only and that the invention is susceptible to a number of modifications or changes, none of which entail any departure from the spirit and scope of the present invention as defined in the hereto appended claims.

What is claimed is:

1. A system for equalizing the torque of at least two A.C. motors driving the same load, comprising:

a first one of the two motors including a first stator winding and a first rotor having a rotating speed, the second one of the two motors including a second stator winding and a second rotor having a rotating speed, the stator windings and rotors each conducting current having a vector representative of the magnitude and angular position of the current in the respective rotor or stator winding;

stator current sensing means for producing an indication of the magnitude of the stator flux current vector in each of the first and second stator windings;

encoder means for sensing the rotating speed of the first and second rotors and producing an indication of each such speed;

first torque control means responsive to the indications of the magnitude of the first stator winding current vector and the speed of the first rotor for controlling the magnitude of the torque of the first motor to be at a maximum value at the rotating speed of the first rotor, the first torque control means further producing an indication of the magnitude of the torque of the first motor; and second torque control means receiving and being responsive to the indication of the magnitude of the torque of the first motor and the indications of the magnitude of the second stator winding current vector and the speed of the second rotor for controlling the magnitude of the torque of the second motor to be substantially the same as the magnitude of the torque of the first motor.

2. The system according to claim 1 wherein:

the second stator winding current vector includes a second flux current vector component and the second rotor current vector includes a second rotor load current vector component; and the second torque control means is responsive to the indications of the magnitude of the second stator winding current vector and the speed of the second rotor to respectively calculate the angular position of the second flux current vector component and the angular position of the second rotor load current vector and control the magnitude of the second stator winding current vector such that the angular position between said second flux current vector component and second rotor load current vector component is 90°.

3. The system according to claim 2 wherein:

the first torque control means is responsive to the magnitude of the first stator winding current vector and the speed of the first rotor to change the magnitude of the torque of the first motor such that the speed of the first rotor also changes; and the second torque control means is responsive to the indication of the changed magnitude of the torque of the first motor to change the magnitude of the second stator winding current vector such that magnitude of the torque of the second motor and the speed of the second rotor also change.

4. The system according to claim 3 further comprising:

a first inverter connected and supplying power to the first motor, the first inverter being responsive to the first torque control means to change the magnitude of the first stator winding current vector; and a second inverter connected and supplying power to the second motor, the second inverter being responsive to the second torque control means to change the magnitude of the second stator winding current vector.

5. The system according to claim 1 wherein:

the load comprises hoist means having first and second gear drive means respectively connected between the first motor and the hoist means and between the second motor and the hoist means; and the first and second motors have a mechanical connection to each other only through the first and second gear drive means and the hoist means.

6. The system according to claim 2 wherein:

the first stator winding current vector includes a first flux current vector component and the first rotor current vector includes a first rotor load current vector component; and the flux current vector components of the first and second stator windings respectively lead the rotor load current vector components of the first and second rotors by an angle of 90° when the first and second motors are respectively operating most efficiently.

7. The system according to claim 1 wherein:

the second motor has a torque demand due to said load; and the second torque control means is unresponsive to the torque demand of the second motor to control the magnitude of the current vector of the second stator winding.

8. A system for equalizing the torque of first and second A.C. motors driving the same hoist drum and a load suspended from the drum, comprising:

first and second adjustable frequency drives;

first and second ones of the two motors respectively including first and second stator windings, the first stator winding being connected to and receiving power from the first adjustable frequency drive and the second stator winding being connected to and receiving power from the second adjustable frequency drive;

the first and second motors respectively include first and second rotors rotating at a speed determined by the frequency of the power from the adjustable frequency drive to which each motor is connected and the magnitude of the load, the rotors and stator windings each conducting current having a vector representative of the magnitude and angular position of the current in the respective rotor or stator;

stator current sensing means for producing an indication of the magnitude of the stator current vector in each of the first and second stator windings which can be used to calculate the torque and the angular position of the stator flux current vector in each of the first and second stator windings;

encoder means for sensing the rotating speed of the first and second rotors and producing an indication of each such speed;

first torque control means receiving the indication of the magnitude of the stator current vector in the first stator winding and the indication of the speed of the first rotor for calculating the magnitudes and angular positions of the first stator flux current vector and first rotor load current vector and the torque of the first motor and controlling the magnitude of the first stator winding current such that the angular position of the first stator winding flux current vector leads the angular position of the first rotor load current vector by 90° whereby the first motor produces maximum torque at the rotating speed of the rotor; and second torque control means receiving the indication of the magnitude of the stator current vector in the second stator winding and the indication of the speed of the second rotor for calculating the magnitudes and angular positions of the second stator flux current vector and the second rotor load current vector and the torque of the second motor, the second torque control means further receiving an indication of the magnitude of the torque of the first motor and comparing the magnitude of the torque of the first and second motors, the second torque control means being responsive to any differential indication in such torque comparison to control the magnitude of the current of the second stator winding such that the angular position of the second stator flux current vector leads the angular position of the second rotor load current vector by 90° and the torque of the second motor is adjusted such that the second motor produces substantially the same torque as the first motor.

9. The system according to claim 8 wherein:

the first torque control means is responsive to a change in the load to change the magnitude of the first stator vector current and thereby change the torque output of the first motor, while maintaining the 90° leading angular position of the first stator flux current vector relative to the first rotor load current vector; and the second torque control is responsive to the change in torque of the first motor to correspondingly change the torque output of the second motor to be substantially equal to the torque of the first motor.

10. The system according to claim 8 further comprising:

hoist means including the hoist drum and first and second gear drive means respectively connected between the first motor and the hoist drum and between the second motor and the hoist drum; and the first and second motors have a mechanical connection to each other only through the first and second gear drive means and the hoist drum.

11. The system according to claim 8 wherein:

the second motor has a torque demand due to said load; and the second torque control means is unresponsive to the torque demand of the second motor to control the magnitude of the second stator current vector to change the torque of the second motor.

* * * * *